United States Patent

[11] 3,586,036

| [72] | Inventor | Gene A. Barnes |
| --- | --- | --- |
| | | Skokie, Ill. |
| [21] | Appl. No. | 880,284 |
| [22] | Filed | Nov. 26, 1969 |
| [45] | Patented | June 22, 1971 |
| [73] | Assignee | Eaton Yale & Towne Inc. |
| | | Cleveland, Ohio |

[54] FLOW CONTROL VALVE
13 Claims, 9 Drawing Figs.

[52] U.S. Cl. ...................................................... 137/486,
137/501, 137/503
[51] Int. Cl. ..................................................... F16k 17/22
[50] Field of Search ............................................ 137/486,
487, 500, 501, 503

[56] References Cited
UNITED STATES PATENTS
| 3,335,748 | 8/1967 | Klemm ......................... | 137/501 |
| 3,357,448 | 12/1967 | Martin .......................... | 137/501 |

*Primary Examiner*—Harold W. Weakley
*Attorney*—Hill, Sherman, Meroni, Gross and Simpson ABSTRACT: Adjustable flow control valve maintaining a preselected constant flow rate with changing inlet pressures and viscosity of the fluid flowing through the valve. The valve includes a pilot control mechanism and a servocontrol mechanism. These mechanisms are in the form of diaphragms subjected to inlet pressure and spring loaded to bias the diaphragms against inlet pressure with a predetermined force. An orifice, the area of which may be preselected, conducts fluid from the inlet or upstream sides of the diaphragms to the downstream sides of the diaphragms. A higher spring acts on the servo diaphragm than on the pilot diaphragm. The diaphragms each have a valve as a part of the diaphragm. As inlet pressure increases the diaphragm valves will move toward seats against the forces of the springs loading the diaphragms and the pressure of the fluid on the downstream side of the pilot and servo diaphragms. The orifice is in the form of a contoured hole wiped by a thin metal cam, to cause a change in orifice area and change in flow, as required.

INVENTOR
GENE A. BARNES

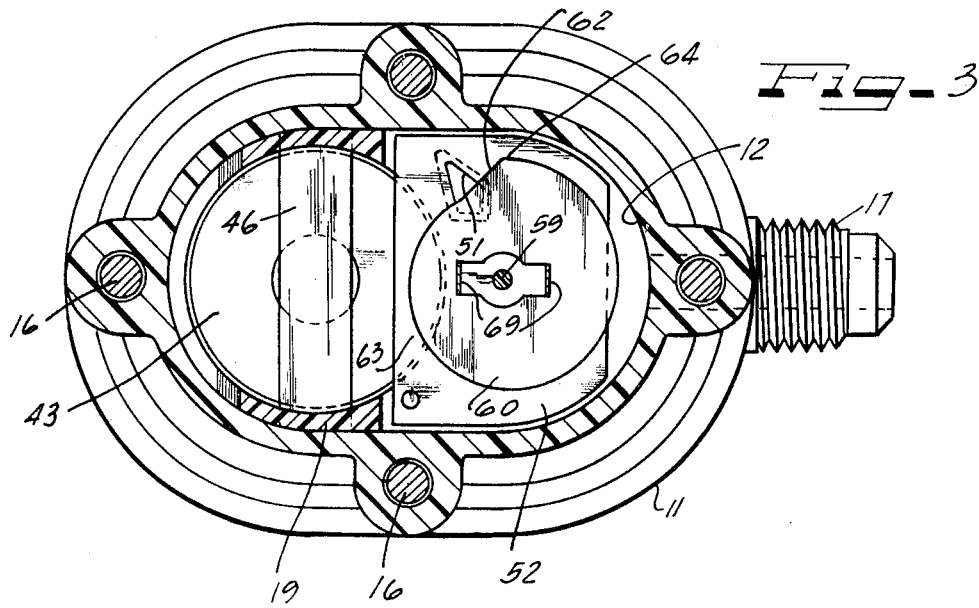
Fig-3
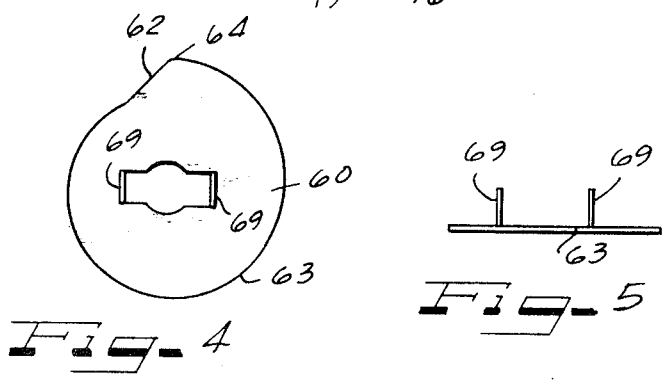
Fig-4
Fig-5
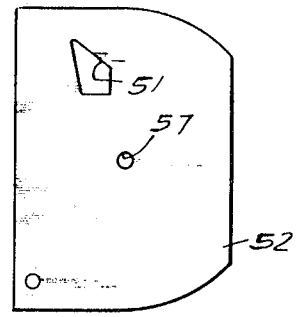
Fig-6
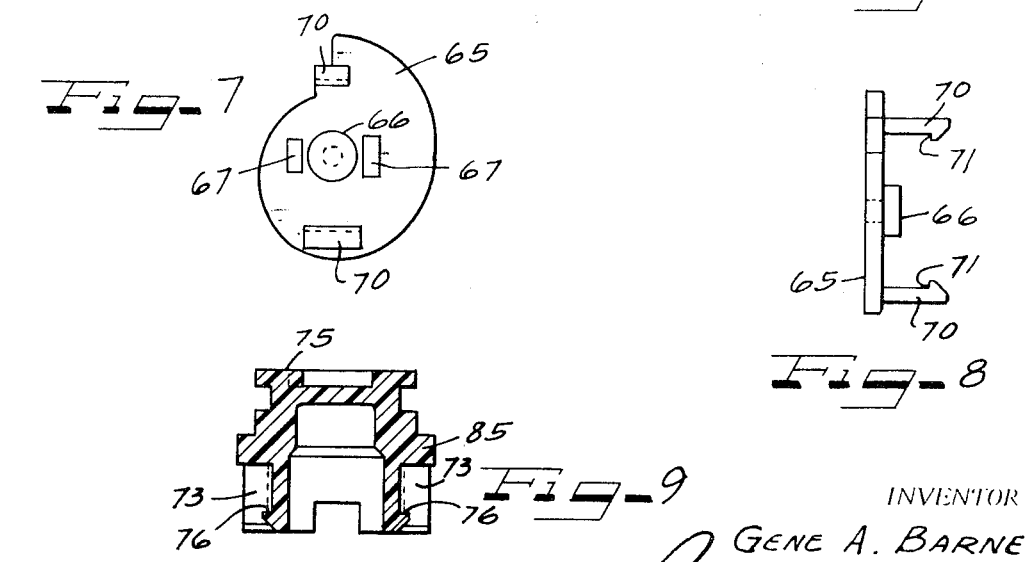
Fig-7
Fig-8
Fig-9
INVENTOR
GENE A. BARNES
BY Hill, Sherman, Meroni, Gross & Simpson
ATTORNEYS

FLOW CONTROL VALVE

SUMMARY AND OBJECTS OF INVENTION

Flow control valve providing a uniform flow of fluid over a wide range of variations in pressure and viscosity, in which servo and pilot diaphragms sense inlet pressure on their upstream sides. The pilot diaphragm senses inlet pressure minus the pressure drop of the fluid flowing through an orifice to the downstream side of the diaphragm. The servo diaphragm senses the pressure drop across the diaphragm which will overcome a servo spring force on the diaphragm and accommodate the servo diaphragm to restrict the flow at the throttle area of the valve.

A principle object of the present invention is to provide a simple and improved form of automatic flow control valve providing a preselected flow of fluid, by utilizing the pressure drop across an orifice to cooperate with spring means and balance the pressure on a pair of pressure operated pilot and servo valves.

Another object of the invention is to provide a flow control valve in which a uniform flow is attained over a wide range of pressure and viscosity variations by utilizing a pilot and a servo diaphragm subject to inlet pressure and determining the operation of the servo diaphragm to throttle the flow of fluid through the outlet of the valve by a spring cooperating with the pressure drop across an orifice and the pressure drop across the pilot diaphragm.

A further object of the invention is to provide an improved form of flow control valve arranged with a view toward utmost accuracy in the control of the flow of fluid and providing a preselected uniform flow over a wide range of pressure and viscosity variations.

Still another object of the invention is to provide a flow control valve particularly adapted to control the flow of syrup in which a desired pressure can be selected and maintained over a wide range of variations of inlet pressure and viscosity of the syrup.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure.

DESCRIPTION OF THE DRAWINGS

FIG. 3 is a horizontal sectional view taken substantially along line III-III of FIG. 2.

FIG. 4 is a top plan view of the thin metal cam operable to vary the size of the orifice from the inlet side to the outlet side of the valve.

FIG. 5 is a view in side elevation of the cam shown in FIG. 4.

FIG. 6 is a plan view of the orifice plate defining the restricted orifice.

FIG. 7 is a plan view of the cam cooperating with the cam plate, to rotatably adjust the position of the cam plate and vary the size of the orifice through the orifice plate.

FIG. 8 is a view in side elevation of the cam shown in FIG. 7; and

FIG. 9 is a sectional view taken through the adjustment member for the cam and cam plate.

DESCRIPTION OF PREFERRED FORM OF INVENTION

Figure 1:
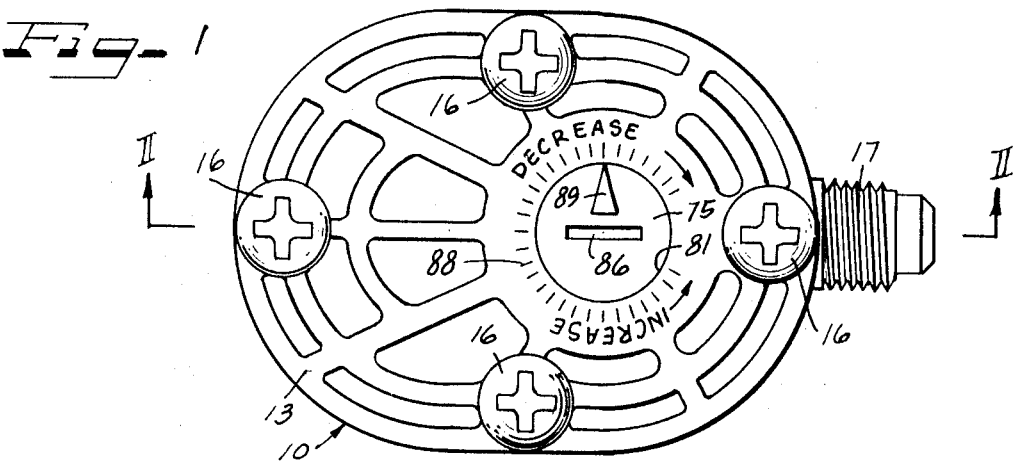
FIG. 1 is a top plan view of an adjustable flow control valve constructed in accordance with the principles of the present invention.
Figure 2:
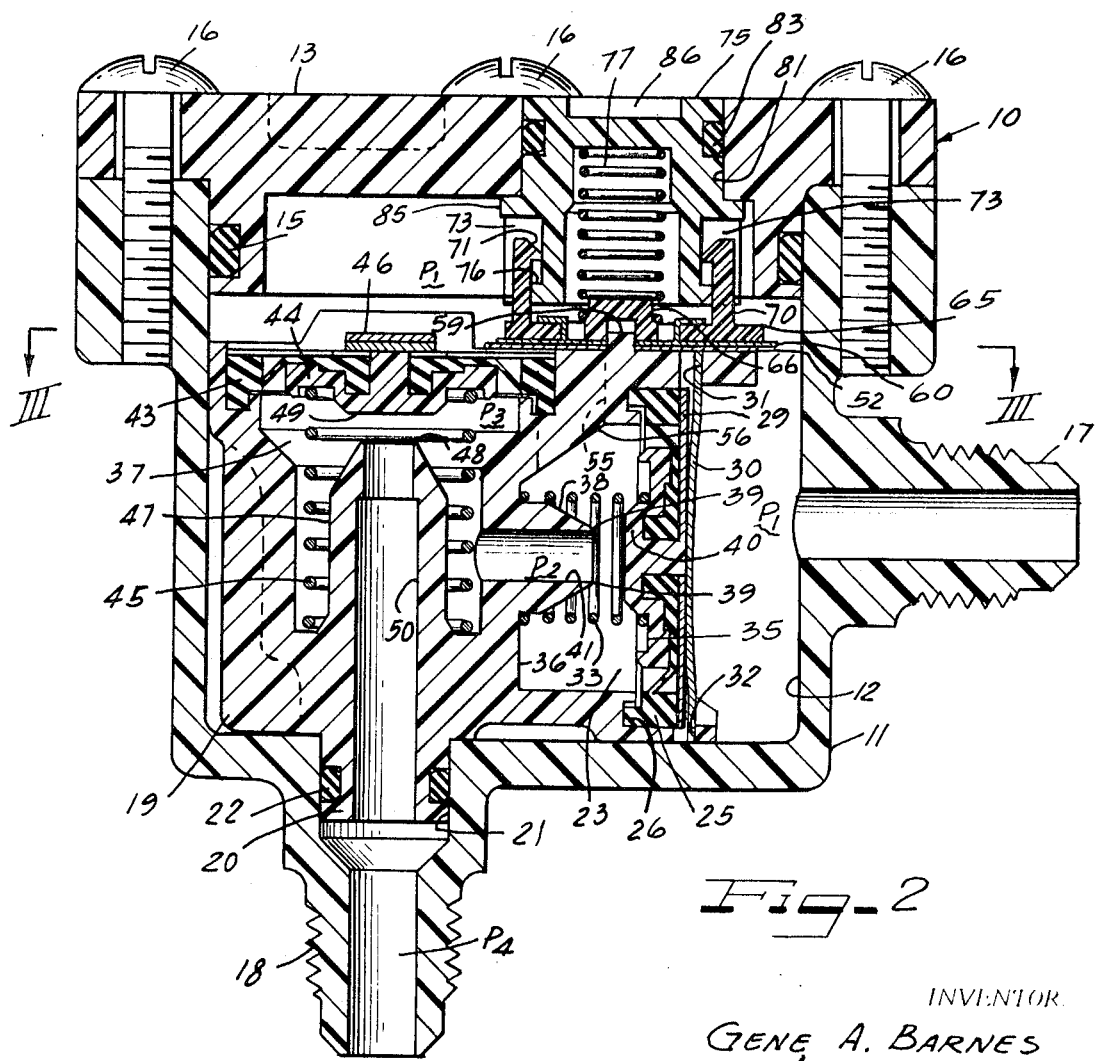
FIG. 2 is a transverse sectional view taken through the valve substantially along line II-II of FIG. 1.

In FIGS. 1, 2 and 3 of the drawings, 10 generally designates an adjustable flow control valve constructed in accordance with the principles of the present invention. The valve includes a valve body 11 having a chamber 12 therein, closed by a top cover 13, sealed to the interior wall of said chamber by an O-ring 15 and having a flanged portion extending along the top of said valve body and secured to said valve body as by screws 16.

An inlet 17 leads into said valve body into the chamber 12. An outlet 18 extending perpendicularly to said inlet and spaced laterally of said inlet leads from said valve body. A sealed insert 19 is mounted within the chamber 12 in the valve body 11 and has a depending annular fitting 20 extending into a cylindrical passageway 21 in communication with the outlet 18 and sealed thereto as by an O-ring 22.

The insert 19 has a pilot chamber 23 therein, shown as facing the inlet 17 and closed by a resilient pilot diaphragm 25, sealed to an annular groove 26 extending about said pilot chamber. A leaf spring 30 abuts and extends across the upstream side of the diaphragm 25 and extends within diametrically opposed abutment recesses 31 and 32 formed in the insert 19. The leaf spring 30 maintains the diaphragm in a preselected neutral position in engagement with a pilot spring 33 seated at one end in a reinforcing member 35 partially recessed within the diaphragm 25, and seated at its opposite end on a wall 36 forming a partition between the pilot chamber 23 and a servo chamber 37. A boss 38 faces the diaphragm 25 and reinforcing member 35 and is encircled by the compression spring 33. The end of said boss 38 facing the diaphragm 25 converges to form a valve seat 39. A valve 40 on the reinforcing member 35 cooperates with said seat to throttle the flow through a passageway 41 defining the inner margin of said valve seat and leading along the boss 38 through the wall 36 into the servo chamber 37.

The servo chamber 37 is closed by a diaphragm 43 like the diaphragm 25 and subject to inlet pressure on its upstream side. A reinforcing member 44 like the reinforcing member 35 is partially recessed in the diaphragm 43 and forms a seat for a servo spring 45 in the servo chamber 37. Said servo spring biases the servo diaphragm 43 into engagement with a leaf spring 46 extending across said diaphragm and mounted at its ends in the insert 19, in the same manner the leaf spring 30 is mounted in said insert. The servo spring 45 is shown as being a compression spring heavier than the spring 33 and as extending about a boss 47 converging at its upper end towards the diaphragm 43, to form a seat 48 for a valve 49 formed on the reinforcing member 44. The seat 48 extends about a passageway 50 in communication with and in axial alignment with the outlet 18.

The pilot diaphragm 25 and the servo diaphragm 43 are both subject to inlet pressure on their upstream sides and are moved by fluid under inlet pressure against their respective springs 33 and 45 to throttle the flow of fluid through the pilot passageway 41 and servo passageway 50, upon variations in pressure, governed by the springs 45 and 33 and the pressure drop of inlet fluid through an orifice 51 formed in an orifice plate 52 and the pressure drop from the pilot chamber 23 to the servo chamber 37. The orifice 51 leads through an orifice plate 52 and has communication with a passageway 55 leading through a partition 56 into the pilot chamber 23. The pressure drop of inlet fluid flowing through the orifice, thus governs the flow of fluid through the outlet 18.

The orifice plate 52 is suitably secured to a plane top surface of the insert 19 with the orifice 51 in alignment with the passageway 55, leading through the wall 56 into the pilot chamber 23. The orifice plate may be made of a thin metal, such as stainless steel, and has a central apertured portion 57 extending about a boss 59, extending upwardly of the plane surface of the insert 19.

A cam plate 60 made from a thin metal such as stainless steel abuts the top surface of the orifice plate 52 and is rotatable about the axis of the boss 59 (FIGS. 3 and 4). The cam plate 60 has a camming surface extending over the orifice 51 and so formed as to reduce the area of the orifice as the cam plate 60 is turned in a clockwise direction and to increase the area of the orifice as the cam plate 60 is turned in a counterclockwise direction. In FIG. 3, the orifice 51 is in its wide open position. The cam surface of said cam plate has a flat edge surface 62 and a curved camming edge surface 63 extending from said flat edge surface and generated about the center of adjustment of said cam plate to form a curved surface gradually increasing in diameter and terminating at a peak 64. Turning of the cam plate 60 about the axis of the boss 59 in a clockwise direction will thus progressively decrease the cross-sectional area of the orifice 51.

The cam plate 60 is backed by a cam drive member 65, shown in FIG. 7 as generally conforming to the form of the cam plate 60. The cam drive member 65 may be made from a relatively rigid plastic material having some resiliency and has a central boss portion 66 opened at its bottom to form a cylindrical recess, and rotatably mounted on the boss 59. The cam drive member 65 has diametrically opposed rectangular apertured portions 67 on opposite sides of said boss, through which extend tangs 69 extending upwardly of the cam plate 60. As shown in FIG. 2, the tangs 69 are bent over the top surface of the cam drive member 65, to retain said cam drive member to said cam plate 60. The cam drive member 65 also has a pair of diametrically opposed upwardly extending drive arms 70 formed integrally therewith and having downwardly facing ledges providing facing hooked portions 71 at the upper ends thereof. The arms 70 and hooked upper ends 71 thereof are snapped into engagement with axially extending slots or grooves 73 in an adjustment member 75. As shown in FIGS. 2 and 7, the bottom portions of the walls forming the slots 73 are beveled, to diverge from the bottoms of said walls and to extend therebeyond to form upwardly facing ledges or hooks 76 cooperating with the hooked ends 71 of the arms 70. A spring 77 is provided to retain the cam drive member 65 and cam plate 60 into engagement with the orifice plate 62. When assembling the members 65 and 75, the two members are brought into axial registry with each other with the arms 70 of the cam drive member 65 in registry with the slots 73 in the adjusting member 75. The members 65 and 75 are then moved toward each other to flex the arms 70 outwardly and accommodate said arms to come into sliding engagement with the slots 73. The spring 77 is seated at one end on the cam drive member 65 about the boss 66 and extends upwardly within a hollow spring recess in the cam adjustment member 75 to bias the member 65 into engagement with the cam plate 60 and to bias the cam plate 60 into firm engagement with the orifice plate 52. The cam adjustment member 75 extends within a cylindrical apertured portion 81 of the cover or cap 13, and is sealed thereto as by an O-ring 83. Said cam adjustment member 75 also has an annular flange 85 defining the upper limits of the grooves or slots 73 and engaging the undersurface of the cover 13 to maintain the cam adjustment member 75 in position by the bias of the compression spring 77. A slot 86 extends diametrically of the top surface of the cam adjustment member 75 to afford a means for turning the cam adjustment member 75 by a screwdriver and the like, to adjust the position of the cam plate 60 relative to the orifice 51, as determined by graduations 88 extending about the apertured portion 81, and an indicia arrow 89 on the top face of the cam adjustment member 75. As shown in FIG. 1, turning of the cam adjustment member 75 in a clockwise direction will effect a decrease in the orifice area in the amount determined by the graduations on the face of the cover 13 while turning in a counterclockwise direction will effect an increase in the orifice area.

The cam adjustment member 75 and the drive member 65 are so constructed as to accommodate the free flow of fluid from the inlet 17 to and along the pilot diaphragm 25 and the servo diaphragm 43, and to provide the same inlet pressure on the servo diaphragm as on the pilot diaphragm.

The pilot diaphragm 25 and servo diaphragm 43 only differ in that the spring 45 on the downstream or servo side of the servo diaphragm gives a greater spring force than the spring 33 on the downstream or pilot side of the pilot diaphragm, which when taken into consideration with the diaphragm effective area will determine the pressure drop across the diaphragm necessary to overcome the force of the spring 45 and cause the servo diaphragm to stroke and move the valve 49 toward the seat 48. Stroking of the valves 40 and 49 effects restriction of the respective seats for said valves to the point where the valves restrict the flow through the respective passageways 41 and 50.

As for example, as the flow through the inlet 17 increases, the pressure drop across the pilot diaphragm will increase until the spring force is overcome and the diaphragm strokes to limit further flow increases. Upon increases in inlet pressure, the pilot diaphragm will thus limit the throttle area and maintain the pressure drop and spring force on the pilot diaphragm constant.

The servo diaphragm 43 senses the same pressure on its upper or outer side as the pilot diaphragm 25. The lower or downstream side of the servo diaphragm senses the inlet pressure minus the pressure drop across the orifice area and the pressure drop across the pilot throttle area. As inlet pressure increases, the pilot will begin to operate and restrict the throttle area. Further increases in inlet pressure will cause the pressure drop across the servo diaphragm 43 to overcome the force of the spring 45 and cause the servo diaphragm 43 to stroke or move toward and from the valve seat 48 and restrict the flow at the throttle area of the valve.

It is evident from the foregoing that the servo diaphragm is operated or controlled by the pilot diaphragm and provides a resultant force amplification, giving greater accuracy in the control of the flow over a larger pressure range. The servo diaphragm 43 stroking against the stronger spring than the spring 33 of the pilot diaphragm 25 and against inlet pressure minus the pressure drop across the orifice area 51, causes a force to be developed which acts directly against the spring force, and has the effect of reducing the pressure drop across the pilot diaphragm, and the flow through the valve. The servo diaphragm thus has the effect of reducing the pressure range through which the pilot control must operate and limiting the amount of pressure change the pilot will have to go through for a given pressure range across the entire valve. Thus, as the pressure drop across the servo diaphragm 43 increases, the flow will have a tendency to decrease because of the force created at the throttle area acting against the spring 45. As this occurs, the pilot diaphragm 25 will sense the pressure drop change and open up to give a reduced pressure drop across the pilot control and thus across the servo diaphragm, which counteracts the force created at the throttle area.

I claim as my invention:

1. In a flow control valve,
   a valve body,
   an inlet into said valve body,
   an outlet from said valve body,
   means maintaining a substantially uniform flow of fluid from said inlet to said outlet, comprising
   fluid pressure operated pilot valve means,
   fluid pressure operated servo valve means,
   said valve means both being subjected to inlet pressure,
   a restricted orifice accommodating the flow of inlet fluid under pressure to counteract inlet pressure acting on said pilot valve means, and
   a passageway controlled by said pilot valve means accommodating the fluid flowing through said orifice to flow to the underside of said servo valve means and counteract the pressure acting on said servo valve means for discharge through said outlet under the control of said servo valve means.

2. The flow control valve of claim 1,
   wherein means are provided for varying the cross-sectional area of said orifice in accordance with a preselected flow of fluid to be delivered from the valve.

3. The flow control valve of claim 1,
   wherein the passageway from the underside of the pilot valve means to the underside of the servo valve means includes a valve seat cooperating with said pilot valve means to control the flow of fluid to the underside of said servo valve means, and wherein the outlet from the valve chamber includes a valve seat cooperating with said servo valve means for controlling the flow of fluid through said outlet in accordance with differences in pressure between inlet pressure and pressure on the underside of said servo valve means.

4. The flow control valve of claim 3,
wherein spring means bias said pilot valve means and said servo valve means away from their respective seats.

5. The flow control valve of claim 4,
wherein the spring means biasing the servo valve means away from its seat is stronger than the spring means biasing said pilot valve means away from its seat.

6. The flow control valve of claim 5,
wherein means are provided for varying the cross-sectional area of said orifice in accordance with flow requirements.

7. A flow control valve of claim 6,
wherein the means for varying the cross-sectional area of said orifice comprises a cam movable over said orifice in accordance with preselected desired pressure ranges.

8. The flow control valve of claim 5,
wherein the pilot valve means includes a diaphragm subject to inlet pressure on its upstream side and having a valve on its downstream side,
wherein the servo valve means includes a diaphragm subject to inlet pressure on its upstream side and having a valve on its downstream side,
wherein spring means biases said pilot valve away from its seat,
wherein spring means biases said servo valve away from its seat, and
wherein the spring means biasing the servo valve away from its seat is heavier than the spring means biasing the pilot valve away from its seat.

9. The flow control valve of claim 8,
wherein manually operable means are provided to vary the cross-sectional area of said orifice.

10. The flow control valve of claim 9,
wherein the orifice comprises a flat orifice plate having an orifice leading therethrough,
wherein means for varying the cross-sectional area of said orifice comprises a flat cam plate having an irregular peripheral surface movable over said orifice,
wherein spring means biases said cam plate into engagement with said orifice plate, and
wherein manually operable means are provided to rotatably move said cam plate to provide a preselected orifice area.

11. In a pressure and viscosity sensitive flow control valve,
a valve body,
an inlet into said valve body,
an outlet from said valve body,
a pilot chamber in said valve body,
a servo chamber in said valve body separated from said pilot chamber,
a valve seat and passageway leading from said pilot chamber to said servo chamber,
a valve seat and passageway leading from said servo chamber to said outlet,
a pilot diaphragm subject to inlet pressure and defining a closure wall for said pilot chamber,
a servo diaphragm subject to inlet pressure and defining a closure wall for said servo chamber,
a pilot valve on said pilot diaphragm cooperating with said pilot valve seat,
spring means biasing said pilot diaphragm away from said valve seat,
a servo valve on said servo valve diaphragm cooperating with said servo valve seat,
spring means biasing said servo valve away from said valve seat,
and a restricted orifice controlling the flow of fluid to said pilot chamber and servo chamber and through said outlet under the control of said pilot and servo diaphragms.

12. The flow control valve of claim 11,
wherein cam means adjustable from outside of said valve body is provided to vary the cross-sectional area of said restricted orifice and provide a preselected flow through said outlet.

13. The flow control valve of claim 11,
wherein a passageway leads from the upstream sides of said pilot and servo diaphragms to said pilot valve chamber,
wherein an orifice plate extends over said passageway and has a restricted orifice in registry therewith,
wherein a cam plate abuts the top surface of said orifice plate,
wherein a cam drive member reinforces said cam plate,
wherein spring means engageable with said cam drive member press said cam plate in firm engagement with said orifice plate,
wherein a manually adjustable member is provided to rotatably drive said cam drive member and provide a seat for one end of said spring, and
wherein said cam drive member is turnable from the outside of said valve body to enable the cross-sectional area of said orifice to be preselected in accordance with a required flow of fluid through said outlet.